June 25, 1929.                D. L. SWENDSÉN                1,718,498
                ARRANGEMENT FOR MANUFACTURING OF SCREWS
                              Filed Jan. 14, 1927
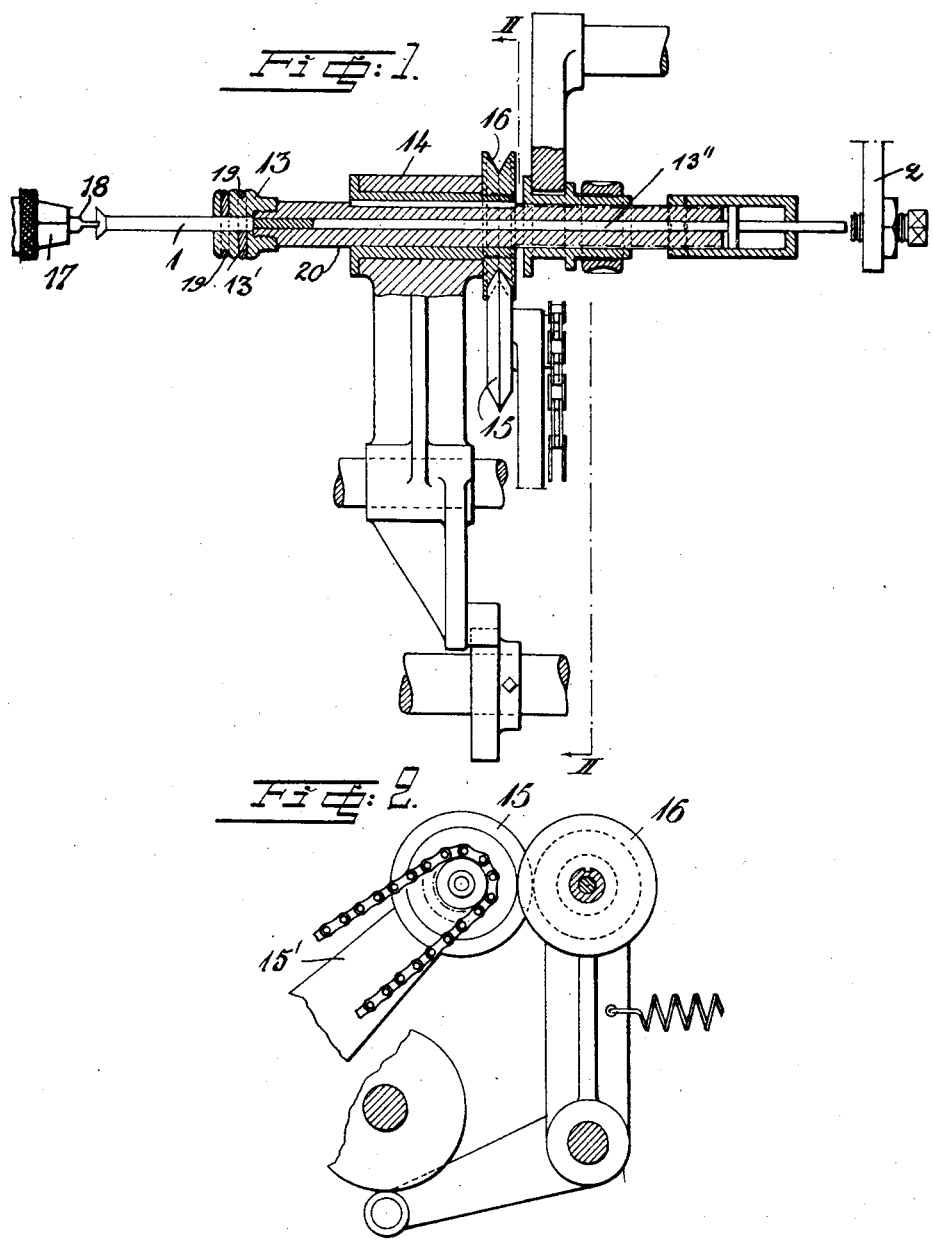
DAVID LEONARD SWENDSÉN
           INVENTOR;

Patented June 25, 1929.

1,718,498

UNITED STATES PATENT OFFICE.

DAVID LEONARD SWENDSÉN, OF NORRKÖPING, SWEDEN.

ARRANGEMENT FOR MANUFACTURING OF SCREWS.

Application filed January 14, 1927, Serial No. 161,075, and in Sweden May 28, 1926.

This invention relates to a device for manufacturing screws in which an arresting means is inserted into the slot in the head of the screw blank to be threaded in the well known manner so as to prevent slippage of the screw while it is being threaded. As the arresting means is stationary, the screw blank must be turned until the slot in its head is in alignment with said arresting means so that said arresting means may enter said slot.

The object of this invention is to provide means for turning the screw blank in such a manner that, when the rotation of the screw blank is stopped by the entrance of said screw arresting means into said slot, the screw rotating means will not exert any substantial torsional force on said screw blank.

This object is accomplished by providing a chuck for ripping said blank, said chuck being carried by a rotating spindle. This spindle is connected to the source of power by a friction clutch which slips when said screw arresting means enters said slot. Furthermore said chuck is of the resilient type and is also capable of slipping when the resistance to its grasping action becomes greater than the grasping strength of its jaws.

Further objects and advantages will appear from the accompanying detailed description of the drawing, in which Figure 1 is a side view of the device partly in section, and Figure 2 is a detail of the driving mechanism for the chuck.

Referring to the drawings in detail 1 is a blank to be threaded which is inserted in the chuck 13 by any desirable method which is mounted on the end of a spindle 20 on which is mounted a friction disc 16 which is driven by a disc cooperating therewith and which in turn is connected to a source of power by a chain or any other transmission means.

It is obvious that when the rotation of the chuck spindle is stopped a slippage will occur between discs 15 and 16 whereby damage to the head of the screw blank and the screw arresting means will be avoided.

The chuck 13 is made up of jaws which are radially slidable pins 13' pressed inwardly by peripheral springs 19 whereby they resiliently grasp the screw blank and slip thereon if the pressure resisting their grasping action is greater than the strength of the peripheral spring.

Inside the spindle carrying chuck 13 is a slidable rod 13'' adjacent the free end of which is a lever 2 whereby said rod may be pushed outwardly to eject the blanks from the chuck 13.

In Figure 1, a conventional chuck 17 is illustrated, having a tapered end 18 to engage the screw head slot. It will be understood that any specific type chuck structure may be utilized for the purpose of engaging the head of the blank 1 during operation of the chuck 13, and that the type of chuck 17 used, in no way affects the present invention as claimed.

Having now described the object of my invention and a practical embodiment of the same, what I claim is:

1. In a machine for manufacturing screws in which arresting means engage the slot in the head of a screw blank to prevent the slippage of said blank during the threading operation, means to bring said arresting means into engagement with said slot comprising a resilient chuck for grasping the shank of said blank, means to rotate said chuck and a friction clutch connecting said rotating means with a source of power whereby destruction of said blank and said arresting means after engagement is prevented.

2. In a machine for manufacturing screws in which arresting means engage the slot in the head of the screw blank to prevent the slippage of said blank during the threading operation, means to bring said arresting means into engagement with said slot comprising a resilient chuck for grasping the shank of said blank, means to rotate said chuck, a friction clutch connecting said rotating means with a source of power whereby destruction of said blank and said arresting means after engagement is prevented, and means for ejecting said blank from said chuck after engagement of said arresting means and said slot.

3. In a machine for manufacturing screws in which arresting means engage the slot in the head of a screw blank to prevent the slippage of said blank during the threading operation, means to bring said arresting means into engagement with said slot comprising a chuck for grasping the shank of said blank having jaws comprising radially slidable pins pressed inwardly by a peripheral spring, said chuck being mounted on a hollow spindle, means for rotating said spindle comprising a friction clutch between said spindle and a source of energy, a rod slidably mounted in said hollow spindle in alignment with the space between the jaws of said chuck and a lever at the free end of said rod for moving it into said chuck to eject the blank from said chuck after engagement of said arresting means with said slot.

In testimony whereof I have affixed my signature.

DAVID LEONARD SWENDSÉN.